United States Patent [19]

Quinn

[11] 4,102,934

[45] Jul. 25, 1978

[54] PREPARATION OF DICHLOROKETENE-KETALS

[75] Inventor: Clayton B. Quinn, Mt. Vernon, Ind.

[73] Assignee: General Electric Company, Schenectady, N.Y.

[21] Appl. No.: 789,020

[22] Filed: Apr. 20, 1977

[51] Int. Cl.² ............................................. C07C 41/04
[52] U.S. Cl. ................................. 260/613 R; 568/726
[58] Field of Search ........................ 260/615 A, 613 R

[56] References Cited

U.S. PATENT DOCUMENTS 3,991,120  11/1976  Ladd ................................ 260/613 R

OTHER PUBLICATIONS

Tanimoto et al., Bulletin of the Chemical Society of Japan, vol. 49(7), (1976), pp. 1931–1936.

*Primary Examiner*—Bernard Helfin
*Attorney, Agent, or Firm*—Joseph T. Cohen; Charles T. Watts

[57] ABSTRACT

Dichloroketene-ketals can be made by the reaction of tetrachloroethylene with an alkali-metal phenate. The latter compounds can be converted to corresponding dihydroxy derivatives which can be phosgenated to make polycarbonate resins useful in the molding and coating arts.

8 Claims, No Drawings

PREPARATION OF DICHLOROKETENE-KETALS

This invention is concerned with a process for making dichloroketene-ketals. More particularly, the invention relates to a process which comprises reacting tetrachloroethylene of the formula

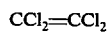

CCl$_2$=CCl$_2$   I with an alkali-metal phenate of the formula

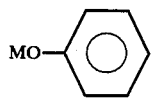

II where M is an alkali-metal ion, in an aprotic solvent to form the diphenyl compound having the formula

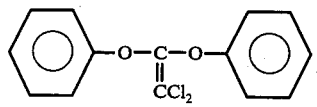

III

The diphenyl compound of formula III can be treated with phenol in the presence of an acid such as hydrochloric acid, as described in my copending application Serial No. 789,019, filed concurrently herewith, now abandoned, and refiled on Aug. 18, 1977 as continuation-in-part application Ser. No. 825,574, both applications being and assigned to the same assignee as the present invention, to form the dihydroxy compound 1,1-dichloro-2,2-bis(4-hydroxyphenyl) ethylene having the formula

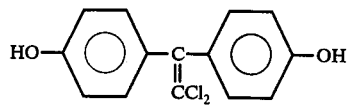

IV

This latter dihydroxy compound can be treated with phosgene or with diphenyl carbonate to form polycarbonate resins (as described in Polish Pat. No. 48,893 issued Dec. 12, 1964) having good impact characteristics while at the same time exhibiting high flame retardant characteristics. Such polycarbonate resins can be used for molding and coating objects which are required to withstand high temperatures and are flame retardant, such as housings for electrical equipment.

Among the alkali-metal phenates which can be employed are, for instance, sodium phenate, potassium phenate, etc. Such phenates can be made by effecting reaction between phenol and compounds yielding an alkali-metal ion, e.g., alkali-metal hydroxides such as sodium hydroxide, potassium hydroxide, etc.; potassium carbonate, sodium carbonate, etc.; potassium phosphate, etc. Among the aprotic solvents which may be employed are, for instance, dimethyl sulfoxide, dimethyl formamide, N,N-dimethyl acetamide, N-methyl pyrrolidone, etc. Mixtures of these solvents are included within the scope of the invention.

The molar ratio of the alkali-metal phenate to the tetrachloroethylene can be varied widely and is preferably equal to at least 2 mols of the phenate per mol of tetrachloroethylene, although as many as from 3 to 10 mols or more of the alkali-metal phenate can be used per mol of the tetrachloroethylene.

Instead of preforming the alkali-metal phenate prior to reaction with the tetrachloroethylene, one also effect reaction in situ between a phenol and an alkali-metal hydroxide or other compound generating the alkali-metal ion, such as potassium phosphate, potassium carbonate, sodium phosphate, sodium carbonate, etc. This in situ formation of the alkali-metal phenate avoids the necessity of preforming the alkali-metal phenate. Thus, one can effect reaction in a reaction vessel between the tetrachloroethylene, the phenol, and the compound generating the alkali-metal ion in a suitable aprotic solvent whereby the alkali-metal phenate is formed in advance for reaction with the tetrachloroethylene. It should be understood that whether the reaction chosen uses the preformed phenate or the phenate is formed in situ, the reaction in both instances is between the alkali-metal phenate and the tetrachloroethylene.

The aprotic solvent concentration may be varied widely, it only being required that sufficient amount of the solvent be used to form a stirrable solution of the reactants and the reaction product. Generally, one can employ, on a weight basis, from 0.5 to 25 parts or more of the aprotic solvent per part of the weight of the mixture of the alkali-metal phenate (or phenol if in situ formation is planned) and the tetrachloroethylene. Temperatures of the order from about 50° C to the reflux temperature of the mass (or higher, e.g., 125° C. if superpressure is used) are usually sufficient for effecting reaction. The use of an inert atmosphere, such as a nitrogen blanket over the reactants while the reactions is being carried out, is advantageously employed. Thereafter the reaction mixture is cooled and water added in an amount sufficient to form a solution of the desired reaction product which can then be extracted with a suitable solvent, e.g., diethyl ether or methylene chloride, dried and distilled to give the diphenyl compound of formula III.

In order that those skilled in the art may better understand how the present invention may be practiced, the following examples are given by way of illustration and not by way of limitation. Stirring and a nitrogen blanket were employed in each atmospheric pressure reaction.

EXAMPLE 1

To a reaction vessel were added 25 grams tetrachloroethylene, 365 ml. dimethyl sulfoxide, 28.3 grams phenol and 19.83 grams potassium hydroxide. While passing nitrogen over the reaction mixture, the mixture was heated at about 135° to 140° C. for 12 hours. At the end of this time, the reaction mixture was allowed to cool, diluted with about an equal volume of water and the aqueous solution extracted three times with 200 ml. diethyl ether. The combined extracts were washed three times with water, dried over magnesium sulfate, ether evaporated, and the residue distilled to give the diphenyl dichloro compound of formula III in a 50% yield.

EXAMPLE 2

The same reaction was carried out similarly as in Example 1 with the exception that 41.5 grams potassium carbonate were substituted for the postassium hydroxide used in Example 1. Also, 300 ml. dimethyl formamide was used in place of the dimethyl sulfoxide of Example 1; after heating the reaction mixture for 20 hours at the reflux temperature of the mass, the diphenyl dichloro compound of formula III isolated was obtained as a water-white liquid boiling at 135° C/0.01 mm Hg in about a 79% yield.

EXAMPLE 3

In this example, 2.84 grams phenol, 2.0 grams potassium hydroxide, and 4.98 grams tetrachloroethylene, together with 38 ml. dimethyl sulfoxide were charged to a pressure vessel, the latter sealed, and the mixture heated with stirring at about 130° C. for about 24 hours. The mixture was cooled, removed from the reaction vessel, water added similarly as in Example 1, and the aqueous mixture was extracted with methylene chloride. The methylene chloride solution was washed with water, dried, and the solvent removed to yield the diphenyl dichloro compound of formula III in a yield of close to 80% of theoretical.

EXAMPLE 4

Employing the conditions similarly as in Example 1, 25 grams of tetrachloroethylene, 28.5 grams phenol, 65 grams $K_3PO_4$, and 300 ml. dimethyl formamide were heated in a reaction vessel with stirring under a nitrogen atmosphere at 150° C. for about 20 hours. At the end of this time, the reaction mixture was worked up similarly as in Example 1 to give the desired diphenyl dichloro compound of formula III.

It will of course be apparent to those skilled in the art that in addition to the conditions described in the foregoing examples, other conditions may be employed without departing from the scope of the invention. Moreover, other alkali-metal phenates and other alkali-metal compounds, examples of which have been given above, can be employed in place of those recited in the examples without departing from the scope of the invention. It will also be apparent that other aprotic solvents, many examples of which have been given above, may be used within the scope of the intended invention.

What I claim as new and desire to secure by Letters Patent is:

1. The process for making a compound having the formula

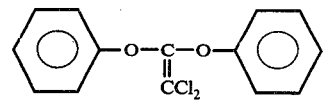

which comprises effecting reaction between an alkali-metal phenate selected from the class consisting of potassium and sodium phenates and tetrachloroethylene in an aprotic solvent and thereafter isolating the formed compound.

2. The process as in claim 1 wherein the reaction is carried out by means of an in situ formation of the alkali-metal phenate by reacting phenol and the tetrachloroethylene in the presence of an inorganic alkali-metal compound capable of generating the alkali-metal ion needed to form the alkali-metal phenate.

3. The process as in claim 2 wherein the alkali-metal compound is potassium hydroxide.

4. The process as in claim 2 wherein the alkali-metal compound is potassium carbonate.

5. The process as in claim 2 wherein the alkali-metal compound is potassium phosphate.

6. The process as in claim 1 wherein the aprotic solvent is dimethyl sulfoxide.

7. The process as in claim 1 wherein the aprotic solvent is dimethyl formamide.

8. The compound having the formula

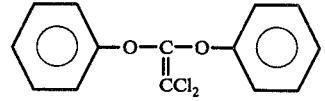

* * * * *